United States Patent [19]

Denz

[11] Patent Number: 4,601,199

[45] Date of Patent: Jul. 22, 1986

[54] METHOD AND DEVICE FOR SELF-DIAGNOSIS OF FINAL SETTING MEMBERS

[75] Inventor: Helmut Denz, Stuttgart, Fed. Rep. of Germany

[73] Assignee: Robert Bosch GmbH, Stuttgart, Fed. Rep. of Germany

[21] Appl. No.: 754,514

[22] Filed: Jul. 11, 1985

[30] Foreign Application Priority Data

Aug. 3, 1984 [DE] Fed. Rep. of Germany ....... 3428620
Sep. 27, 1984 [DE] Fed. Rep. of Germany ....... 3435465

[51] Int. Cl.$^4$ ........................................... G01M 15/00
[52] U.S. Cl. .................................. 73/118; 364/431.11
[58] Field of Search ............. 73/119 A, 118; 123/479; 364/431.05, 431.11, 431.12

[56] References Cited

U.S. PATENT DOCUMENTS 4,414,950 11/1983 Otsuka et al. ...................... 123/479
4,521,769 6/1985 Dudeck et al. ................. 123/479 X Primary Examiner—Jerry W. Myracle
Attorney, Agent, or Firm—Michael J. Striker

[57] ABSTRACT

A method of and a device for a self-diagnosis of setting members in complex controlling and regulating systems, particularly for the self-diagnosis of an idling speed air charge adjustor of an internal combustion engine, includes the following functional stages: the self-diagnosis is performed at certain operational conditions at which a regulating path governed by a regulating subsystem pertaining to the setting member does not react to a change of the latter and the operation of a motor vehicle thus remains unaffected; the comparing of plausibility of the control signals for the setting member with a second control signal from another regulating subsystem is performed by comparing both control signals with a known, previously determined relation, which is stored in a memory.

11 Claims, 2 Drawing Figures

METHOD AND DEVICE FOR SELF-DIAGNOSIS OF FINAL SETTING MEMBERS

BACKGROUND OF THE INVENTION

The present invention relates in general to compound controlling or regulating systems and in particular to a method of and a device for self-diagnosis of the operation of a final setting member pertaining to one subsystem of a complex regulating system including additional additional subsystems, particularly for use in an internal combustion engine.

In many fields of technology it is conventional to determine magnitudes, values or positions by means of regulation or a control in which a regulator produces a variable, usually an electric signal having certain functional course which is applied to a final control or setting member. The regulator receives from the assigned regulating path input signals and processes the same in dependency on the resulting adjustment of the setting member. In this manner, the control behavior of the regulator depends on the evaluation of the measured actual values of the result of regulation.

In this arrangement it is conventional to provide, without major difficulties, a self-regulation or the so-called fail-safe circuits which detect electrical signals occurring at predetermined points and evaluate or check the same as to their correctness. Problems arise, however, when a diagnosis of the setting member itself is to be done without causing reaction in the regulating loop controlled by the setting member. To avoid this undesirable reaction it is necessary to inactivate the whole regulating system or, alternatively, to pick up the movement of the setting member by means of additional hardware component parts and evaluate these changes for the purposes of the diagnosis.

As known, a measure is always available to perform simply a diagnosis of the operation of a setting member at an inactivated regulating system in such a manner that the setting member under test is activated by the application of an external signal and then the setting member is monitored either visually or when that is not possible, by means of sensors or an auditory test.

The following considerations relate specifically to the conditions of diagnosis of a setting member of the so-called idling speed air charge regulator in internal combustion engines for which the present invention is particularly suitable. It will be understood, however, that this mention is not limited to the self-diagnosis of such air charge regulators for idling speed range of an engine, but can be applied in any kinds of controlling and regulating systems.

In the preferred application field of this invention, namely in regulating internal combustion engines or regulating systems which intensively affect the operation of a motor vehicle such as, for example, the systems known under the name Montronic or L-jetronic which are mostly controlled by microprocessors, then in such devices the self-diagnosis of participating components is increasingly felt as desirable and necessary. Testing of sensors in respective regulating systems is relatively simple inasmuch as signals produced by the sensors are applied as input magnitudes in the microprocessor and can be easily tested by means of a corresponding subroutine in the program. The testing of controlling or setting members controlled by the regulators or controlling devices however is substantially more expensive because from the inputs of the regulator at least feedbacks to the microprocessor would be necessary which would necessitate additional hardware component parts and wiring. Moreover, a mechanical failure or damage of the setting member itself (for example seizing of an air charge controlling element) cannot be recognized by these measures.

SUMMARY OF THE INVENTION

It is therefore a general object of the present invention to overcome the aforementioned disadvantages.

In particular, it is an object of the invention to provide a possibility to perform a self-diagnosis of the operation of final controlling elements or setting members of a regulating system without using additional hardware and without disturbing the normal operation of the controlled or regulated device whereby a true message related indirectly to the movement of the setting member, is available for evaluation.

In keeping with these objects and others which will become apparent hereinafter, one feature of the invention resides in a method of the aforedescribed kind, in the steps of activating the entire controlling or regulating system, controlling the setting member at a predetermined time point of the system at which a regulating path governed by a subsystem pertaining to the setting member does not react to a change of the setting member, and simultaneously measuring an actual value of a signal from an additional subsystem which only indirectly affects the setting member, then comparing possibility of a change of the setting member and of the signal from the additional subsystem with a set of data stored in a memory and containing a correlation of changes of the setting member with respect to measured changes of the signal from the additional subsystem, the correlation being made for at least one predetermined operational point of the system. The device for performing the method of this invention includes means for detecting the predetermined operational condition of the system, and comparing means including a memory for storing the set of data containing the functional correlation of the changes of the two signals, the comparing means being activated by the detecting means to compare plausibilities of the two signals with respect to the stored set of data.

The invention has the advantage that without any additional expenditures the self-diagnosis of operation of setting members can be made inclusive of their mechanical function. The diagnosis itself, depending on the structure and integration of the participating subsystems is made at least partially in software by a suitable program and by the comparison of measured and stored values made at certain time intervals. The diagnosis and the comparison can be made by the same microprocessor which controls the operation of the setting member in the corresponding regulating subsystem.

The concept of the invention is such that the consequence of the controlling action performed for the self-diagnosis of the setting member is at least indirectly determined namely by means of an actual signal which has been already generated in another subsystem for a different regulating purpose and this actual signal is applied to the entire combined system. When this concept is applied to the special exemplary embodiment concerning self-diagnosis of a setting member pertaining to idling speed air charge regulators during the operation of an internal combustion engine, the actual signal is the measured value of pressure or of the air flow or air mass in the air intake manifold of the internal combustion engine and this signal is evaluated as a function of the reaction of the air charge regulator for idling speed whereby the regulation for which the air charge regulator generates partial components does not need any data related to the air flow values but utilizes as an actual signal a rotary speed value.

The invention makes it possible not only to test the correct function of the setting member at a certain operational point but also to start a setting variation which can detect during the entire operational course also mechanical damages such as clamping or seizing of the setting member defective contacts and other disturbances.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
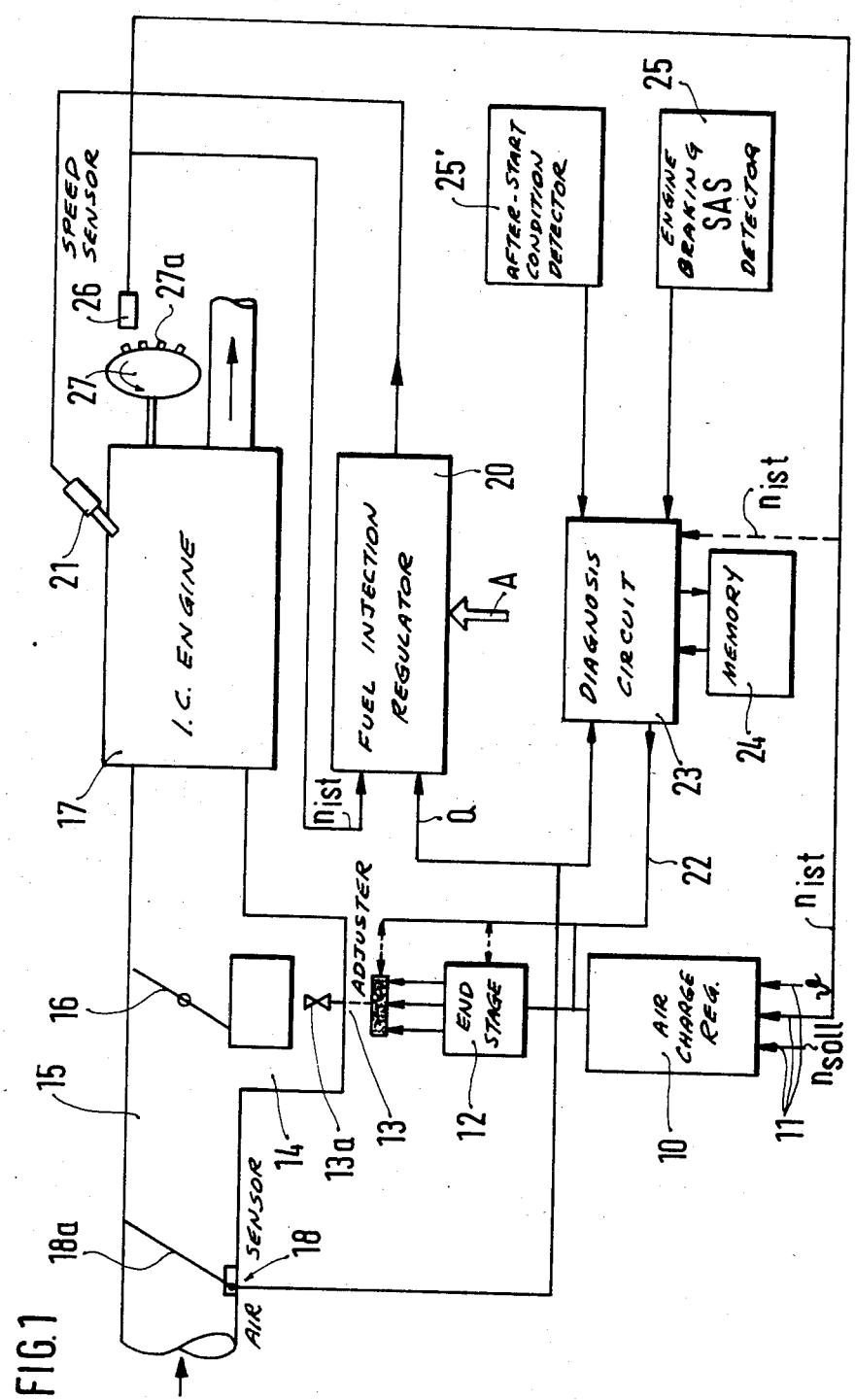
FIG. 1 is a block circuit diagram of an embodiment of the invention for the self-diagnosis of a setting member in an internal combustion engine represented by discrete components.

The basic idea of this invention can be summarized as follows: in a combined regulating or controlling system a setting member pertaining to a certain subsystem is activated at such operational conditions at which a regulating path governed by the subsystem does not show any substantial reaction to the change of the setting member and accordingly no corresponding (undesired) effects are present and also the actual value produced by the subsystem remains inaffected; at the same time, however, a signal pertaining to an actual value of another subsystem is evaluated and correlated with a quantity regulated by the setting member under test.

In this connection it will be pointed out that the following explanation of the invention which is made by means of an exemplary embodiment exemplified by discrete circuit blocks is not limited to such a construction. The invention resides exclusively in the functional relations and special functional processes which can be realized in different forms. It will be understood that the individual structural units and can be designed in an analog, digital or hybrid technology or as a whole or partially they can be also realized by a corresponding software in programmable digital systems such as microprocessors, computers, digital or analog logic circuits and the like. The invention described in the following paragraphs therefore is to be understood in the terms of individual functional relationships and time courses of the effects of individual blocks and the cooperation of partial functions of the illustrated discrete components. The reference to individual circuit blocks is made merely for facilitating the understanding of this invention.

In the following description of the preferred embodiments a special application is described of the self-diagnosis of a setting member or adjustor for idling speed air charge regulator during the operation of an internal combustion engine.

In principle, such an idling speed air charge regulation consists of the following functional blocks: an air charge regulator 10 has a plurality of inputs supplied with certain input signals corresponding to the desired value $n_{soll}$ of the rotary speed, to the actual value $n_{ist}$ of the rotary speed, to the temperature $\theta$ of the engine and the like. Upon processing of the input signals in the regulator an output signal is applied to the end stage 12 which controls a setting member which, in this example is in the form of a so-called two winding type rotary adjustor 13 controlling a valve 13a arranged in an air bypass conduit 14 of an air intake manifold 15. At a closed pivotal plate 16 (idling operation) in the manifold 15, the adjustor valve 13a controls air flow supplied to an internal combustion engine 17 in such a manner that the actual rotary speed $n_{ist}$ is kept within predetermined limits.

The combined regulating system for the engine 17 further includes, apart from the integrated idling speed air charge regulating subsystem, also an electric or electronic fuel injection regulating subsystem and/or ignition regulating subsystem and as the case may be also additional regulating subsystems inclusive of a load sensing unit, air pressure sensing unit or an air flow or air mass sensing unit in the intake manufold 15. An air flow sensor which will be described below is indicated in FIG. 1 by reference numeral 18 and includes a mechanically tiltable air flow sensor flap 18a whose angle of inclination is a measure for an air quantity Q supplied through the intake manifold to the engine. The fuel injection regulator 20 utilizes, among others the air quantity signal Q and the rotary speed actual value signal $n_{ist}$ and generates at its output injection control signals which are applied to fuel injection valves 21. The fuel injection regulator 20 receives at its input a plurality of additional signals indicative of operational conditions which are schematically illustrated in FIG. 1 by the arrow A.

The details of the processing of signals in respective regulating subsystems is not necessary for the understanding of this invention and therefore will not be further discussed. It is apparent, however, that the testing or diagnosis of the idling speed air charge setting member or adjustor 13 inclusive of its mechanical operability is at least very expensive and cumbersome because no data are available about the momentary position of the valve 13a and even return lines for the electrical control signals applied to the setting member or adjustor 13 would require additional wiring (hardware).

At this point the method and device of this invention becomes effective. Initially, operational conditions of the internal combustion engine are chosen such at which driver of a motor vehicle at normal operation of the latter, that means at a running engine and without disconnecting of the function of the combined regulating systems, does not perform any actuation of the gas pedal and at which a change in the setting of the idling speed air charge setting member has no unexpected (undesirable) effects on the driving behavior of the motor vehicle or on the operation of the engine. In such operational conditions, starting from the normal setting value of the adjustor 13, a change of the idling speed air charge opening is made by applying a correspondingly different control signal. The resulting change of the air flow or air mass or of pressure in the air intake manifold is measured and tested. It will be noted that the changed setting of the adjustor 13, 13a is caused by the corresponding action on the idling speed air charge regulator 10 or its end-stage 12, or a separate control signal is applied to the air charge setting member via conduit 22 from a separate diagnosis circuit 23. It will be pointed out however that this diagnosis circuit 23 can be also a portion of a program in a microcomputer, that means for example in the microcomputer controlled Montronic or L-jetronic system.

Operational conditions which are suitable for the self-diagnosis control of the idling speed air charge adjustor is preferably the overrun or engine braking operation of the motor vehicle with an overrun or thrust disconnection above a predetermined rotary speed threshold, for example above about 1800 rpm. If above this rotary speed threshold the adjustor 13a is further opened, then it is simultaneously possible to test whether by this action the air quantity or load signal measured by the sensor 18 is changing, taking into account if needed, the drop of rotary speed. Such a control of the adjustor is not noticeable in the overall driving behavior of the motor vehicle inasmuch as due to the overrun or thrust disconnection the fuel injection is at any rate interrupted and consequently only the air throughflow through the intake manifold 15 and the engine 17 is changed.

With reference to the example of an air flow measuring system then for a normal predetermined opening $T_1$ of the adjustor plotted in dependency on the rotary speed n in engine braking operation of the vehicle according to the characteristic of FIG. 2a a load signal $t_{L1}$ is produced (FIG. 2b) meeting the following equation:

$$t_{L1} = Q_L(T_1)/n.K$$

Figure 2:
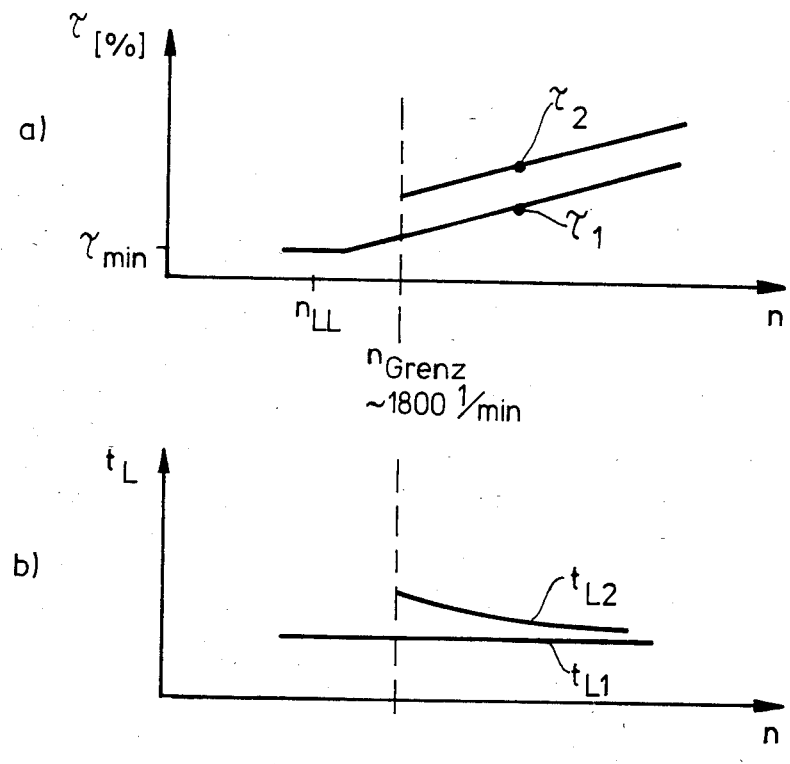
FIGS. 2a and 2b show respectively plot diagrams illustrating, respectively, the relationship of the opening of a setting member, in percents, of an idling speed air charge regulator and the corresponding load signals related to this curve, versus the rotary speed in overrun or engine braking operational condition of the internal combustion engine.

When in conformity with the diagnosis control signal the adjustor 13 is momentarily opened, for example for the keying ratio $T_2$ in the control signal for the two coil rotary adjustor, then in accordance with the characteristic line of the load signal versus rotary speed n (FIG. 2b), the load signal $t_{L1}$ must be increased to a value $t_{L2}$. The values or data resulting from the characteristic curves of FIG. 2 are stored in a storage or memory 24 constituting part of the diagnosis circuit 23 or are stored at suitable locations in the memory of a microcomputer or microprocessor forming the regulating subsystem. In this manner it is possible for a "good" evaluation or diagnosis to make from the stored data the requisite correlation between the setting of the adjustor and the corresponding load signal.

Since the self-diagnosis is to be performed only at certain operational conditions, the particular examplary embodiment of this invention illustrated in FIG. 1 is also provided with a block 25 for detecting engine braking operation or with the block 25' for detecting after start condition as it will be explained below. The diagnosis circuit 23 is supplied, apart from information about operational conditions needed for carrying out the diagnosis of the air charge adjustor, also with an actual rotary speed signal which is also available during operation of the engine and is delivered for example by a sensor 26. The rotary speed sensor 26 can be constructed in any suitable manner, for example as an inductive or capacitive sensor detecting a succession of markings 27a on a marker disc 28 rotating synchronously with the crankshaft of the engine.

Depending on the magnitude of the resulting rotary speed in the engine braking operation and on the duration of the engine braking operation, it is of course possible to proceed with the testing of the entire variation range of the adjustor and to check up also the functional cause and the correctness of operation of the setting member or adjustor also at changed values of the applied input signals. When the entire functional range in the position of the adjustor is processed then it is also possible to test or detect loose contacts, e.g. when at a continuous change of the control or diagnosis signal jump in the change of the load signal occurs. By virtue of the continuously performed correlation between a certain diagnosis control signal for the adjustor and the expected load signal a fast and, if desired at certain operational conditions, a repeated self-diagnosis of the setting member or adjustor is possible.

The self-diagnosis of this invention can be used not only in connection with the overrun or thrust disconnection of the motor vehicle. In another exemplary embodiment of testing or self-diagnosis of the idling speed air charge regulator, a suitable operational condition of the engine is the after start condition represented by the block 25' in FIG. 1. During an afterstart operation, at an initial large opening of the adjustor caused by the idling speed air charge regulator itself, an increased idling speed is adjusted. Thereafter, due to the closing of the air adjustor the large amount of air is deregulated until the desired idling speed is set. Under the corresponding consideration of the change of the actual rotary speed the resulting variation of the air flow measured by sensor 18 can be correlated with the change of the opening of the adjustor and tested as to possibility in the diagnosis circuit 23.

In the latter case, the diagnosing process is also initiated by a suitable after start signal; however, it is not the diagnosis circuit 23 which in this case controls the air charge adjustor but the control signal is applied to the latter and parallel to the diagnosis circuit 23 or to the corresponding parts in a microcomputer which in the presence of the after start signal is simultaneously supplied with the load signal from another regulating subsystem and compares the supplied and/or measured values or functional courses with a set of data containing the correlations.

While the invention has been illustrated and described as embodied in a specific example of a device for self-diagnosis of setting members, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of self-diagnosis of a setting member pertaining to one subsystem of a complex regulating system including additional subsystems, particularly for use in an internal combustion engine, comprising the steps of actuating, during normal operation of the system, the setting member at a predetermined time point at which a regulating path governed by the one subsystem does not react to a change of the setting member, and simultaneously measuring an actual signal from an additional subsystem which only indirectly affects said setting member; then comparing plausibility of changes of the setting member and of the signal from the additional subsystem, with a set of data stored in a memory, said data containing a correlation of respective stages of the setting member to the measured changes of the signal from additional subsystems.

2. A method as defined in claim 1, wherein the setting member is an idling speed air charge adjustor, the correlation between the variation of the air charge adjustor and the measured signals from the additional subsystem is made during the overrun or engine braking operation at a thrust disconnection or cutoff above a predetermined rotary speed threshold, and the actual signal from the additional subsystem is the load signal derived from the measurement of pressure, air flow or air mass in an air intake manifold which is generated for the determination of fuel injection control signals in an electronic fuel injection subsystem.

3. A method as defined in claim 2, wherein said predetermined rotary speed threshold n is equal to or greater than 1,800 rpm.

4. A method as defined in claim 2 further comprising the step of actuating the functional course of the setting member over the entire possible variation range and the corresponding changes of the correlated actual signal from the other subsystem is determined as a load signal and compared with stored interdependent functional courses for controlling plausibility.

5. A method as defined in claim 2, wherein the setting member is activated by a diagnosis control signal generated in a diagnosis circuit at the occurrence of at least one operational condition of the engine, the diagnosis control signal being evaluated as to its course and under consideration of the changing value of the actual signal from the additional subsystem and a plausibility comparison is made between the two signals.

6. A method as defined in claim 5, wherein said operational condition suitable for the self-diagnosis are over-run-or engine braking operation of a motor vehicle or an after start operational condition and said actual signal pertaining to the additional subsystem is a load signal.

7. A method as defined in claim 2, wherein said complex regulating system includes microprocessor or a microcomputer controlled by a program whose part generates a control signal for the self-diagnosis of the air flow adjustor, the microprocessor or microcomputer processing the actual values of pressure, air flow or air mass measured in an intake manifold and another part of the program compares the functional courses of the measured actual values under consideration of a rotary speed signal, with stored correlation data.

8. In a controlling or regulating complex system having a plurality of subsystems each controlled by a control signal, a device for a self-diagnosis of a setting member controlled by a first control signal pertaining to one subsystem, comprising means for determining an operational condition in which regulating path governed by said one subsystem does not react to a change of said setting member; means for measuring a second control signal pertaining to another subsystem which is only indirectly affected by a change of the setting member; means for comparing plausibility between the first control signal and the second control signal; said comparing means being activated by said operational condition determining means and including a memory for storing data containing information about functional relation between the change of the setting member and the measured second control signal.

9. A device as defined in claim 8, wherein said one subsystem is idling speed air charge regulator in a regulating system of an internal combustion engine and said setting member is an air flow adjustor.

10. A device as defined in claim 9, further comprising an additional regulating subsystem for fuel injection signals and/or ignition signals responsive to a load signal derived from the measurement of pressure air flow or air mass in an air intake manifold; means for sensing rotary speed of the engine; said comparing means comparing plausibility of the first control signal for the setting member with the measured load signal and comparing during the predetermined operational condition such as overrun or engine braking or during after start, the measured rotary speed of the engine with data stored in said memory.

11. A device as defined in claim 11, wherein said means for determining an operational condition includes an after start condition determining means and a thrust cutoff determining means connected respectively to said comparing means.

* * * * *